United States Patent [19]
von Strandtmann et al.

[11] B 3,916,013
[45] Oct. 28, 1975

[54] SUBSTITUTED-O-HYDROXY-OMEGA-(METHYLSULFINYL-ACETOPHENONES AND PROCESS FOR PRODUCING SAME

[75] Inventors: Maximilian von Strandtmann, Rockaway Township; John Shavel, Jr., Mendham; Sylvester Klutchko, Hackettstown; Marvin Cohen, New Milford, all of N.J.

[73] Assignee: Warner-Lambert Company, Morris Plains, N.J.

[22] Filed: Jan. 30, 1974

[21] Appl. No.: 438,053

[44] Published under the Trial Voluntary Protest Program on January 28, 1975 as document no. B 438,053.

Related U.S. Application Data

[63] Continuation-in-part of Ser. No. 174,947, Aug. 25, 1971, Pat. No. 3,801,644.

[52] U.S. Cl. ......... 260/592; 260/243 R; 260/283 S; 260/289 R; 260/293.89; 260/315; 260/340.5; 260/562 R
[51] Int. Cl.² ......................................... C07C 49/82
[58] Field of Search .................................... 260/592

[56] References Cited
UNITED STATES PATENTS
3,801,644   4/1974   von Strandtmann et al. ...... 260/592

*Primary Examiner*—James O. Thomas, Jr.
*Assistant Examiner*—James H. Reamer
*Attorney, Agent, or Firm*—Albert H. Graddis; Frank S. Chow

[57] ABSTRACT

The present invention relates to substituted-o-hydroxy-ω-(methylsulfinyl)acetophenones of the formula I

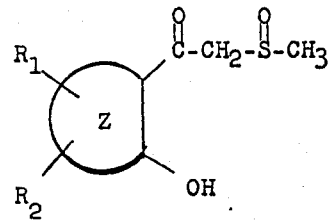

I wherein Z is an aromatic or heteroaromatic nucleus such as benzene, naphthalene, anthracene, phenanthrene, pyridine, quinoline, isoquinoline, carbazole, benzothiazine, and the like; wherein $R_1$ is halogen, lower alkoxy, hydroxy, acetamido, alkyl, aralkyl, or aryl; $R_2$ is hydrogen, halogen, hydroxy, alkyl, aralkyl, or aryl; or $R_1$ and $R_2$ taken together may form a 1,3-dioxole ring. The compounds of the present invention are useful as intermediates for the production of chromones which exhibit anti-allergenic properties.

8 Claims, No Drawings

SUBSTITUTED-O-HYDROXY-OMEGA-(METHYLSULFINYL-ACETOPHENONES AND PROCESS FOR PRODUCING SAME

This application is a continuation-in-part of pending prior Pat. application Ser. No. 174,947, filed Aug. 25, 1971, now U.S. Pat. No. 3,801,644.

As used throughout the specification and claims, the term "alkyl" and the "alkyl" portion of "alkoxy" embraces both straight and branched alkyl radicals containing from 1 to 9 carbon atoms, for example, methyl, ethyl, propyl, isopropyl, n-butyl, n-amyl, n-hexyl, 2-ethylbutyl, 2,3-dimethylbutyl, and the like. The term halogen encompasses fluorine, bromine, chlorine and iodine. The term "aryl" denotes an aromatic hydrocarbon of 6 to 8 carbon atoms such as phenyl, tolyl and the like. The term "aralkyl" encompasses alkyl groups in which aryl as previously defined is substituted for a hydrogen atom such as for example benzyl, phenylethyl, and the like. The term "acyl" means those hydrocarbon carboxylic acids of less than 12 carbon atoms as exemplified by the lower alkanoic acid, e.g., acetic, propionic, butyric, the aryl carboxylic acids, e.g., benzoic and toluic acid and the like.

The applicants had found in perfecting the process for the production of 3-(hydroxymethyl)chromones that an o-hydroxy-ω-(methylsulfinyl)acetophenone would serve as an intermediate for their production. This process and products are fully set forth in their copending application, Ser. No. 112,765, now abandoned. One method of preparing o-hydroxy-ω-(methylsulfinyl)acetophenone is set forth in the J. Am. Chem. Soc. 85, at page 3413 (1963) as part of an article by Becker, et al. The method of preparation described therein dissolves potassium-t-butoxide in DMSO and later reacting the resulting product with methyl salicylate. The yield reported was 18% of theory. The same method could be used to produce a variety of o-hydroxy-ω-(methylsulfinyl)acetophenones depending on the selection of starting reagents. The article concerns itself simply with the chemistry involved and gives no indication that such materials have any specific use.

Applicants in their present invention have determined that the unsubstituted-o-hydroxy-ω-(methylsulfinyl)acetophenone shown in Becker has no utility for the purposes of the present invention, in that the chromone produced using this compound as an intermediate has no oral anti-allergenic activity and further, when administered interperitoneally, produces CNS side effects such as convulsions.

It is an object of the present invention to provide an improved method for the production of o-hydroxy-ω-(methylsulfinyl)acetophenones.

It is a further object of the present invention to provide intermediates from which pharmacologically active end compounds may be produced.

Another object of the present invention is to provide a method for the production of o-hydroxy-ω-(methylsulfinyl)acetophenones which is of high efficiency.

The process of the present invention may be stated generally as follows:

Sodium hydride which may be used as a dispersion in mineral oil is added to a mixture of DMSO (dimethyl sulfoxide) in an inert organic solvent. The solvent is chosen on the basis of it being inert to the reactants and its having a suitable boiling point in view of the temperatures at which the desired reaction takes place. For the purpose of the present invention, benzene is the preferred inert solvent. DMSO and benzene are placed in a reaction vessel and the vessel is then swept with nitrogen. The mixture is agitated by bubbling the nitrogen through it or by mechanical stirring or shaking. Sodium hydride (57% dispersion in mineral oil) may be added all at once or incrementally. The nitrogen atmosphere is maintained above the mixture, the agitation is continued, and the mixture is heated to a temperature in the range of 75° to 80° for about ¾'s of an hour to 1 hour. This is the preferred range of temperature which should not be exceeded by much since temperatures much above this may cause decomposition of the sodium methylsulfinylmethide. If too much heat is added to the system, it may become explosive. Temperatures much lower than the preferred range, while operable, decrease the reaction rate excessively. When the reaction is complete, the mixture in the vessel is cooled to about 35° C.

The second part of this process is that wherein an aromatic ester, having the hydroxy group in the ortho position with respect to the carboxyl group, is added to the sodium methylsulfinylmethide in the reaction vessel incrementally while stirring or otherwise agitating the mixture. This reaction is exothermic. It is desirable to carry it out at such a rate that the temperature does not rise above 50°. The stirring is continued until such time as the temperature falls to about 25°, which usually is only a matter of about ½ hour. The reaction mixture is then diluted with ether. A precipitate forms which may be filtered out. The precipitate is washed with dry ether and then dissolved in ice water. The solution is filtered and the filtrate acidified with glacial acetic acid. A precipitate is formed.

The unsubstituted o-hydroxy-ω-(methylsulfinyl)-acetophenone produced by this method is white, crystalline, has a melting point of 151° to 153° and is produced in a yield of 88% theory as contrasted with a yield of 18% theory following the procedure described by Becker, et al.

This compound when used to prepare the corresponding unsubstituted chromone produced a compound which, when screened for anti-allergenic properties, showed none when administered orally to laboratory rats but did induce disturbances of the CNS such as convulsions when administered intraperitoneally.

The following examples are set forth by way of exemplification and not by way of limitation:

EXAMPLE 1.

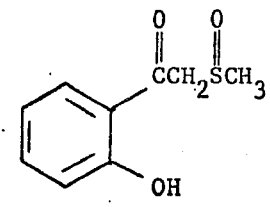

2'-Hydroxy-2-(methylsulfinyl)acetophenone.

This compound was prepared by reacting, under a stream of nitrogen, a solution of 12.66 g of NaH (57%) mineral oil dispersion in a mixture of 50 ml DMSO and 350 ml of benzene with 16.6 g of ethyl salicylate. The NaH, DMSO, benzene mixture was heated at 75° to 80°C for 1 hour then cooled to 35°. Ethyl salicylate was added with stirring over a period of 2 minutes. The temperature rose to 50°. The stirring was continued for 30 minutes by which time the temperature had fallen to 25°. Ether was added to bring the total volume of the mixture to 2 liters. A precipitate formed and was filtered out, washed with dry ether and dissolved in 150 ml of ice water. The solution was filtered and the filtrate acidified with 24 g of glacial acetic acid. The precipitate formed was filtered off, washed with water and recrystallized from absolute ethanol. Product was white, crystalline mp 151°–153°. Yield of 17.5 g was 88% of theory.

EXAMPLE 2

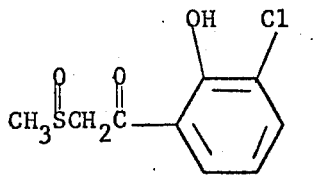

3'-chloro-2'-hydroxy-2-(methylsulfinyl)acetophenone.

This was prepared by reacting a solution of 4.4 g of NaH (57%) in a mixture of 60 ml of DMSO and 120 ml of benzene with 5.6 g of methyl 3-chlorosalicylate (Ber., 61, 2565 (1928), Reissert & Cramer) in analogous fashion to 3'-hydroxy-2-(methylsulfinyl)-2'-acetonaphthone. The material was recrystallized from abs. ethanol, mp. 121°–23.5°; yield 4 g (57%).

Anal. Calcd for $C_9H_9ClO_3S$: C, 46.46; H, 3.90; S, 13.78. Found: C, 46.39; H, 3.87; S, 13.74.

EXAMPLE 3

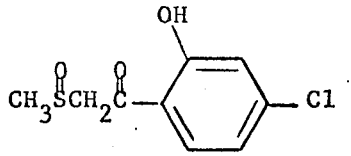

4'-Chloro-2'-hydroxy-2-(methylsulfinyl)acetophenone.

This material was prepared by reacting a solution of 4.4 g of NaH (57% oil dispersion) in a mixture of 60 ml of DMSO, and 120 ml of benzene with 5.6 g of methyl 4-chlorosalicylate* in analogous fashion to 3'-hydroxy-2-(methylsulfinyl)2'-acetonaphthone. The material was recrystallized from abs. ethanol, mp. 142°–44°; yield 3 g (43%).
*French Patn. M1973.

Anal. Calcd for $C_9H_9ClO_3S$: C, 46.46; H, 3.90; S, 13.78. Found: C, 46.22; H, 3.81; S, 13.71.

EXAMPLE 4

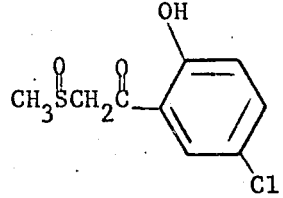

5'-Chloro-2'-hydroxy-2-(methylsulfinyl)acetophenone.

This was prepared by reacting a solution of 4.4 g of NaH (57% oil dispersion) in a mixture of 120 ml of benzene and 60 ml. of DMSO with 5.6 g of methyl 5-chlorosalicylate* in analogous fashion to 3'-hydroxy-2-(methylsulfinyl)-2'-acetonaphthone. The material was recrystallized from abs. ethanol, mp. 144°–47°; yield 4.5 g(64%).
*Beilstein 10, 103

Anal. Calcd for $C_9H_9ClO_3S$: C, 46.46; H, 3.90; S, 13.78. Found: C, 46.69; H, 3.85; S, 13.68

EXAMPLE 5

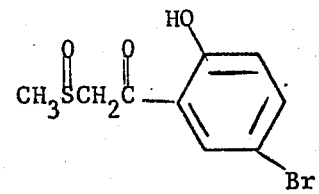

5'-Bromo-2'-hydroxy-2-(methylsulfinyl)acetophenone.

This was prepared by reacting a solution of 4.4 g of NaH in a mixture of 60 ml of DMSO and 120 ml of benzene with 6.93 g of methyl 5-bromosalicylate* in analogous fashion to 3'-hydroxy-2-(methylsulfinyl)-2'-acetonaphthone. The material was recrystallized from abs. ethanol, mp. 148°–49°; yield 5 g (60%).
*Aldrich Chem. Co., Milwaukee, Wis.

Anal. Calcd. for $C_9H_9BrO_3S$: C, 39.01; H, 3.27; S, 11.57. Found: C, 39.26; H, 3.36; S, 11.64

EXAMPLE 6

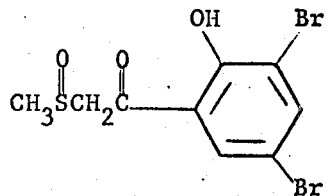

3',5'-dibromo-2'-hydroxy-2-(methylsulfinyl)acetophenone.

This was prepared by reacting a solution of 4.4 g of NaH (50% oil dispersion) in a mixture of 120 ml of benzene, and 60 ml of DMSO with 9.27 g of methyl 3,5-dibromosalicylate* in analogous fashion to 3'-hydroxy-2-(methylsulfinyl)-2'-acetonaphthone. The material was recrystallized from abs. ethanol, mp. 154°–54.5°; yield 3 g (28%).
*Beilstein, 10, 110

Anal. Calcd for $C_9H_8Br_2O_3S$: C, 30.36; H, 2.26; Br, 44.89; S, 9.01. Found: C, 30.23; H, 2.32; Br, 44.65; S, 9.26.

EXAMPLE 7

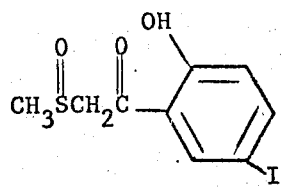

2'-Hydroxy-5'-iodo-2-(methylsulfinyl)acetophenone.

This was prepared by reacting a solution of 4.4 g of NaH (57% oil dispersion) in a mixture of 120 ml of benzene and 60 ml of DMSO with 8.34 g of methyl 5-iodosalicylate* in analogous fashion to 3'-hydroxy-2-(methylsulfinyl)-2'-acetonaphthone. The material was recrystallized from abs. ethanol, mp. 143.5°–45°; yield 5.5 g (56%).

*Ann. Chim. (Rome), 57, 607-15 (1967).

Anal. Calcd for $C_9H_9ClO_3S$: C, 33.35; H, 2.80; S, 9.89. Found: C, 33.51; H, 2.79; S, 10.14.

EXAMPLE 8

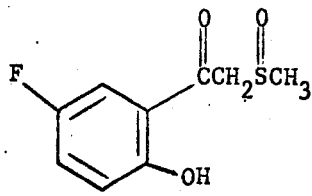

5'-Fluoro-2'-hydroxy-2-(methylsulfinyl)acetophenone.

This compound was prepared by reacting a solution of 31 g of NaH (57%) in a mixture of 425 ml. of DMSO and 850 ml of benzene with 36 g of methyl 5-fluorosalicylate (Chem. Abstr., 63 16255 b) in analogous fashion to 3'-hydroxy-2-(methylsulfinyl)-2'-acetonaphthone. The material was recrystallized from methanol, mp. 154°-57°; yield 30 g. (67%).

Anal. Calcd for $C_9H_9FO_3S$: C, 49.99; H, 4.20; S, 14.83. Found: C, 49.89; H, 4.23; S, 15.07.

We claim:

1. A compound of the formula:

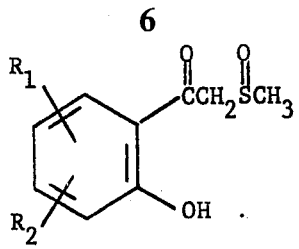

wherein $R_1$ is hydrogen or halogen and $R_2$ is halogen.

2. A compound according to claim 1 which is 3'-chloro-2'-hydroxy-2-(methylsulfinyl)acetophenone.

3. A compound according to claim 1 which is 4'-chloro-2'-hydroxy-2-(methylsulfinyl)acetophenone.

4. A compound according to claim 1 which is 5'-chloro-2'-hydroxy-2-(methylsulfinyl)acetophenone.

5. A compound according to claim 1 which is 5'-bromo-2'-hydroxy-2-(methylsulfinyl)acetophenone.

6. A compound according to claim 1 which is 3',5'-dibromo-2'-hydroxy-2-(methylsulfinyl)acetophenone.

7. A compound according to claim 1 which is 2'-hydroxy-5'-iodo-2-(methylsulfinyl)acetophenone.

8. A compound according to claim 1 which is 5'-fluoro-2'-hydroxy-2-(methylsulfinyl)acetophenone.

* * * * *